Figure 1:
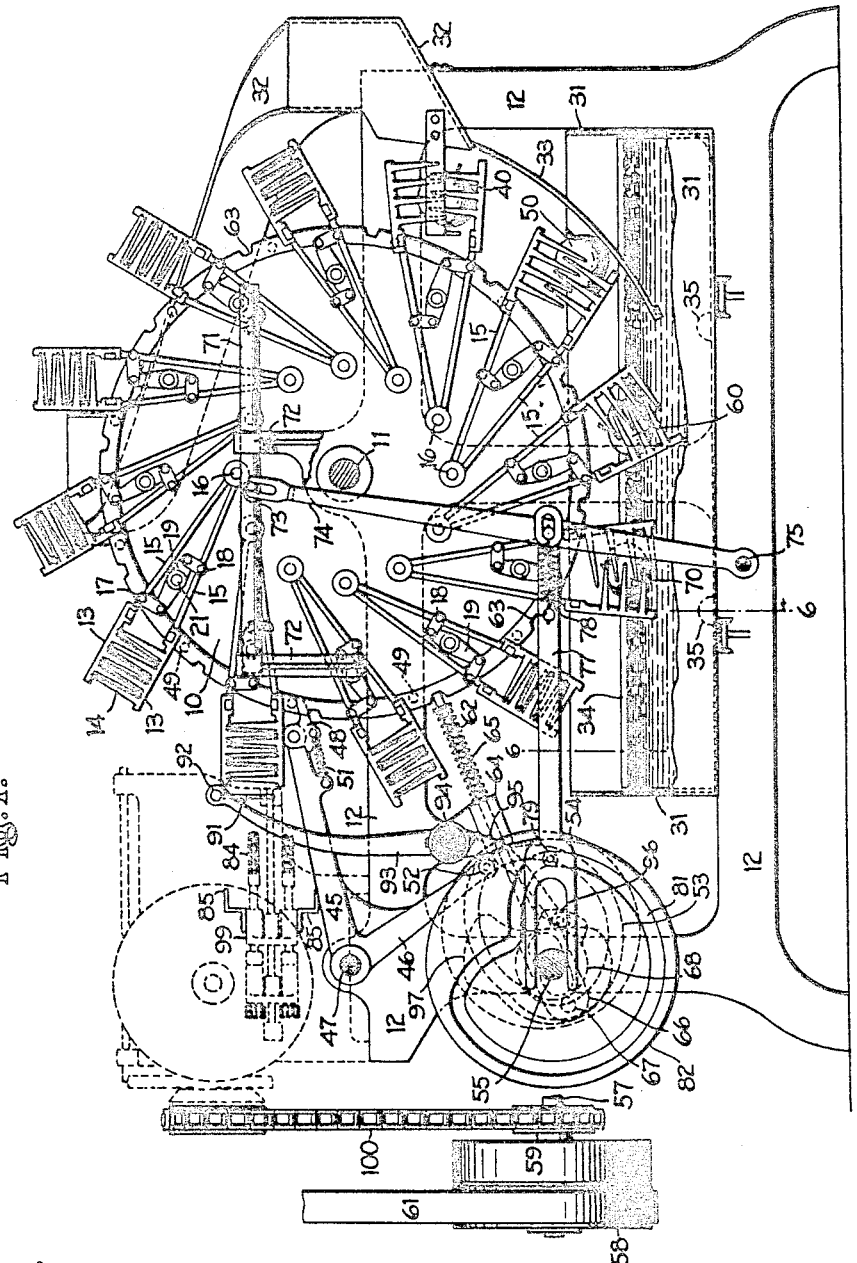

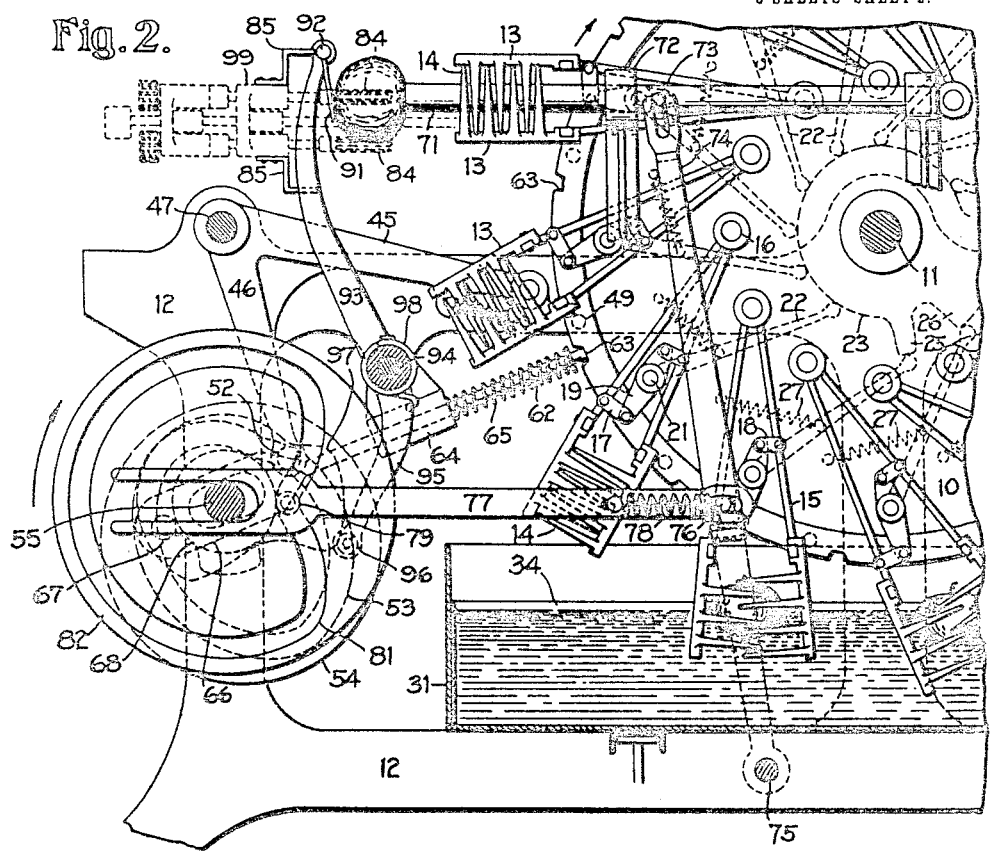
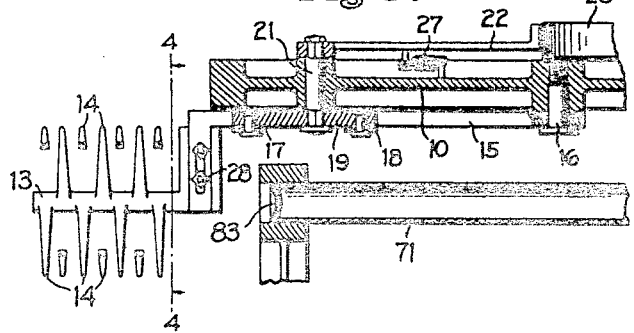
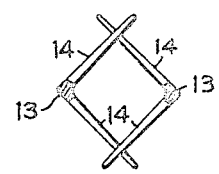

F. B. & J. W. PEASE.
FRUIT FEEDING MACHINE.
APPLICATION FILED DEC. 6, 1912.
1,109,541.
Patented Sept. 1, 1914.
3 SHEETS—SHEET 3.
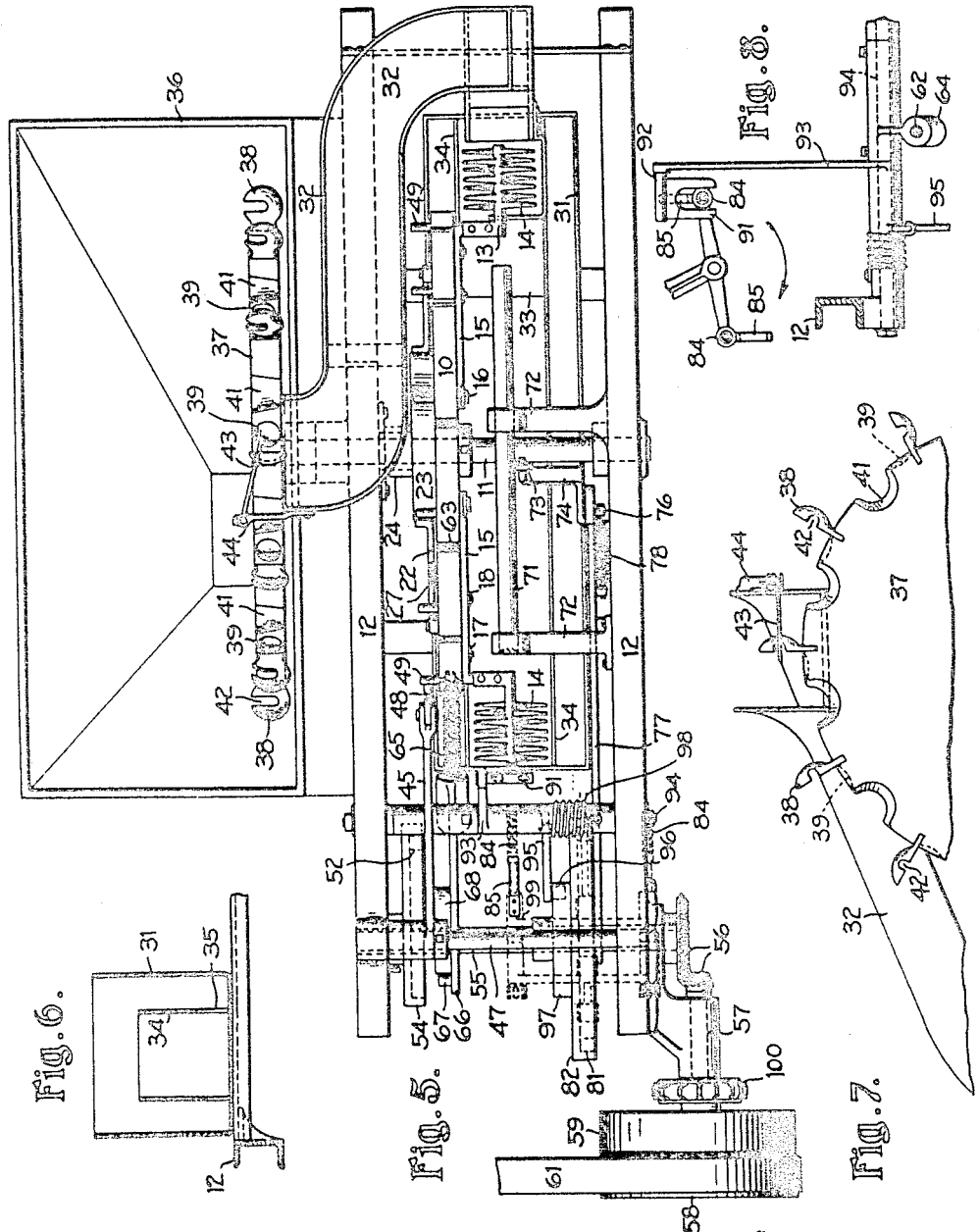
Witnesses:
Clarence W. Carroll
L. Thon
Inventors:
Franklin B. Pease
John W. Pease
by their attorneys
Osgood, Davis & Dorsey

UNITED STATES PATENT OFFICE.

FRANKLIN B. PEASE AND JOHN W. PEASE, OF ROCHESTER, NEW YORK.

FRUIT-FEEDING MACHINE.

1,109,541. Specification of Letters Patent. Patented Sept. 1, 1914.

Application filed December 6, 1912. Serial No. 735,315.

*To all whom it may concern:*

Be it known that we, FRANKLIN B. PEASE and JOHN W. PEASE, citizens of the United States, and residents of Rochester, in the county of Monroe and State of New York, have invented certain new and useful Improvements in Fruit-Feeding Machines, of which the following is a specification.

This invention relates to machines by which apples, or other fruit, may be fed, one by one, to a machine for paring or otherwise operating upon the fruit.

In feeding apples to a paring-machine it is necessary that they be presented to the fork of the machine with their core-axes substantially in line with the axis of rotation of the fork. It has heretofore been proposed to produce this result by making use of the fact that an apple, when floated in water, will automatically assume a position with its core-axis vertical. In the pending applications of John W. Pease, one of the applicants herein, Serial No. 619,105, filed April 5, 1911, and Serial No. 663,182, filed November 29, 1911, machines are disclosed which operate upon this principle, these machines being provided with endless conveyers carrying fruit-holders which are brought successively into and out of a receptacle adapted to contain water, so that the apples within the holders may be floated and caused to assume definite positions in the holders. The present application relates partly to improvements in machines of this type, and one object of the invention is to produce a machine in which only the fruit-holders are immersed in the water, the endless conveyer being so arranged as not to enter the water. To this end, in the present machine, we arrange the conveyer entirely above the water-receptacle, in such a position that the fruit-holders are immersed in the receptacle only at the lowermost part of their path of movement.

Another object of the present invention is to provide for transferring the fruit more positively from the fruit-holders to the fork or other instrumentality of the machine with which the feeding-machine coöperates. To this end we employ means engaging the fruit firmly at both ends of its core-axis during the transferring movement, so that the fruit is held firmly against any angular movement of its core-axis at this time.

A third object of the invention is to simplify the mechanism of the machine as a whole, and to this end we employ, among other features of construction hereinafter set forth, an endless conveyer in the form of a rotary member or wheel, upon the periphery of which the fruit-holders are mounted; and, in order that the fruit-holders may operate properly in connection with such a conveyer, we mount the fruit-holders thereon at such an angle that they are, at their time of emergence from the water-receptacle, in a position in which their axes are substantially vertical.

Other objects of the invention, and the features of construction by which they are attained, will be set forth in connection with the following description of the preferred embodiment of the invention.

In the accompanying drawings:—Figure 1 is a front-elevation of a machine embodying the present invention, with certain parts broken away to show the construction more clearly; Fig. 2 is a front-elevation, on a larger scale, of a portion of the machine, in a different operative position from Fig. 1, illustrating particularly the means for transferring an apple to the fork of a paring-machine; Fig. 3 is a detail-view showing, in horizontal section, one of the fruit-holders and portions of the adjacent mechanism; Fig. 4 is a section on the line 4—4 in Fig. 3; Fig. 5 is a plan-view of the entire machine, with some of the fruit-holders omitted for the sake of clearness; Fig. 6 is a detail-view of the water-receptacle, on the line 6—6 in Fig. 1; Fig. 7 is a rear-elevation of the upper part of the mechanism for supplying the apples to the fruit-holders; and Fig. 8 is a detail-view showing, in elevation, looking from right to left, a portion of the transferring-mechanism, together with a portion of the apple-paring machine with which it coöperates.

In the illustrated embodiment of the invention the endless conveyer, by which the fruit-holders are carried, is in the form of a rotary member or wheel 10, comprising a solid web or disk mounted and fixed upon a horizontal shaft 11, which is journaled to rotate in the frame 12 of the machine. Each fruit-holder comprises two relatively-movable members consisting of stems 13 from which fingers 14 project in double rows, the fingers of the two rows being substantially at right angles to each other, as shown in Fig. 4. The fingers on the two stems of each holder are so spaced that they interlace, thus defining and inclosing a quadrilateral space of which the diameter may be varied by moving the stems toward and from each other. Each stem is provided with a shank fixed to an arm 15, each pair of arms being pivoted upon a stud 16 fixed in the conveyer-wheel 10. To move the arms and the stems toward and from each other the arms of each pair are connected, by links 17 and 18 respectively, with a lever 19 which is fixed upon a short shaft 21 journaled transversely in a bearing in the wheel. At its rear end each shaft 21 is provided with an arm 22 which projects inwardly and engages a cam 23. This cam, by means of a sleeve 24, is fixed rigidly upon the frame 12, around the shaft 11. Accordingly, as the conveyer-wheel rotates the arms 22, in following the periphery of the cam, are moved outwardly at certain points in their path of movement, thus rocking the shafts 21 and the levers 19, and moving the arms 15 and the stems 13 of each pair apart, thus opening the fruit-holders. To close the fruit-holders upon the fruit contained therein at the proper times, a spring 27 connects each arm 22 with the wheel 10, as shown in Fig. 3, this spring acting resiliently when the arm 22 reaches a low point in the cam 23, to move the parts in a direction to swing the stems 13 together and cause the fingers 14 to approach each other.

The receptacle for the water in which the fruit is floated is in the form of an elongated tank 31 mounted upon the frame 12 below the conveyer-wheel, in such position that the lowermost fruit-holders dip into the water in the tank. The apples or other fruit are delivered, one by one, to the successive fruit-holders through a chute 32, which discharges into the holders as they reach a substantially horizontal position at the right-hand side of the conveyer-wheel, as shown in Fig. 1. At this time the fruit-holder which is to receive an apple is in wide-open position, owing to the fact that the corresponding arm 22 rests upon a high part 26 of the cam 23. The fruit-holder remains in this open position while it is moving downwardly into the water-receptacle, and at this time the apple is held within the fruit-holder by means of a stationary curved supporting-surface 33 (Fig. 1).

The conveyer-wheel is moved intermittently, through partial rotations, by means which will be presently described, and each movement is sufficient to carry each of the fruit-holders from one of the positions illustrated in Fig. 1 to the next position illustrated therein, that is to say, through a space equal to the distance between two adjacent fruit-holders. The arrangement is such that two fruit-holders with the fruit therein are always immersed in the water, and in the position of rest of the parts these two fruit-holders are held wide open, so that the fruit therein is free to assume its natural position of flotation. During the intervening movements of the conveyer-wheel, however, the two fruit-holders in question are caused to close upon and grip the fruit therein. As shown in Fig. 2, this closing movement is caused by forming the cam 23 with a low point adjacent the extremity of the high part 26, followed by a second high part 25. The low point in question is engaged by each arm 22 while the corresponding fruit-holder is moving from one of the positions of immersion to the other, while the high part 25 holds each fruit-holder open during the dwell just preceding its withdrawal from the water.

Since the movement of the fruit-holders through the water, during the rotative movements of the conveyer-wheel, tends to agitate the water, we employ an arrangement adapted to minimize this agitation, so that there may be as little interference as possible with the righting-action of the water upon the fruit. To this end we provide, within the tank 31, baffles in the form of parallel walls 34 which are spaced apart only sufficiently to permit the fruit-holders to pass freely between them. These walls 34 prevent waves from traversing the water-receptacle transversely and impinging upon the fruit. During the movements of the fruit-holders the water is forced between the walls 34 toward the left-hand end of the tank 31. Since the upper edges of the walls 34 are near the upper lever of the water, the water so moved may pass freely over them into the tank 31, and then find its way quietly back between the walls 34 by means of openings 35 at the bottom. This arrangement is such that the violent agitation produced by the movement of the fruit-holders is immediately checked when the fruit-holders come to rest, and the fruit floats in a tranquil body of water during the dwells in the movement of the conveyer, while at the same time we are enabled to use a tank of large capacity, adapted to contain a quantity of water which will not require frequent replenishing to maintain the necessary level.

In the machines of the previous applications above referred to the endless conveyer, in the form of chains passing over rollers, was arranged to be immersed at its upper portion in the water-tank or receptacle, and consequently it tended to constantly withdraw more or less water therefrom, which was caught in a lower tank or receptacle and conveyed back to the upper tank by suitable means. The present arrangement not only dispenses with the immersion of the conveyer in the water, but also is such that any water carried upwardly by the fruit-holders may drop back directly into the tank in which the apples are floated, thus substantially simplifying the machine in this respect, and preserving the conveyer against the injurious action of water upon its mechanism.

In order to deliver the apples one by one to the fruit-holders through the chute 32, we employ a mechanism shown particularly in Figs. 5 and 7. The supply of apples is contained in a hopper 36 having three converging walls and one vertical wall. Close to the inner surface of this front vertical wall is a disk or wheel 37, which is fixed to the shaft 11 so as to rotate in unison with the conveyer-wheel 10. The disk 37 is provided with a series of substantially hemispherical scoops 38, which are equal in number to the fruit-holders on the conveyer-wheel. In front of each scoop is a concave seat 39, the seat and the scoop together being adapted to support and raise one apple from the mass in the hopper. The size of these parts is such, however, that they will not support two apples even of the smallest size, and in case two or more apples are raised from the mass by any one of the scoops one or more of these apples will roll off either from the rear-side of the scoop or else forwardly into the recess 41 in front of the support 39.

In order that the apples may be discharged from the scoops into the chute, each scoop has a recess 42 in its rear edge, and a resilient wiper 43 is mounted upon a bracket 44, fixed to the chute 32 in such a position that this wiper enters the recess 42 when the scoop reaches a position opposite the end of the chute. The wiper thus engages the apple and discharges it from the scoop into the chute. At each partial rotation of the conveyer-wheel the mechanism just described acts to discharge an apple into the chute, this apple rolling down the chute, through the action of gravity, and entering the fruit-holder which is in position to receive it.

The means for imparting intermittent partial rotation to the conveyer-wheel are shown particularly in Figs. 1 and 2. A bell-crank lever, comprising arms 45 and 46, is pivoted on a stud 47 on the frame 12, and the arm 45 of this lever carries a pivoted dog 48 which coöperates with a series of pins 49 on the rear of the conveyer-wheel. The dog is controlled by a spring 51 which permits it to pass idly by the pins 49 at each downward movement of the arm 45, but on the succeeding upward movement the dog engages one of the pins positively, and thus moves the conveyer-wheel through the necessary distance. To actuate the lever for this purpose its lower arm 46 is provided with a cam-roller 52, which engages a cam-path 53 in the front surface of a cam 54. This cam is fixed upon a cam-shaft 55 which is rotated constantly by means shown in Fig. 5. These means comprise gears 56 by which the cam-shaft is connected with a power-shaft 57.

The power-shaft is provided with any suitable means, such as fast and loose pulleys 58 and 59, through which it may be connected, by a belt 61, with any suitable source of power.

In order that the conveyer-wheel may be held firmly against accidental rotation during the dwells of its successive movements, we employ locking-mechanism comprising a plunger 62 which coöperates with a series of notches 63 in the periphery of the conveyer-wheel. This plunger slides through a bearing 64 in the frame of the machine, and is normally held in operative position by a spring 65 coiled about the plunger. The left-hand end 66 of the plunger spans and slides upon the cam-shaft 55, as shown in dotted lines in Figs. 1 and 2, and it is provided with a cam-roller 67 which engages the periphery of a cam 68 fixed on the cam-shaft. This cam, as shown in dotted lines, is provided with a high point which acts to withdraw the plunger and unlock the conveyer-wheel just before and during each rotative movement thereof.

To discharge the apples from the fruit-holders and impale them upon a fork of the apple-paring machine, or transfer them to an analogous instrumentality of any machine which it is desired to feed by means of the present invention, we employ a plunger 71 which slides horizontally through bearings 72 on the frame of the machine. This plunger is adapted to pass axially through the one of the fruit-holders which is in horizontal position at the left of the conveyer-wheel, as shown in Fig. 2. To actuate the plunger it is provided with a pin 73 which is embraced by the forked upper end of a lever 74, this lever being pivoted, at its lower end, upon a stud 75 on the frame of the machine. A pin 76, projecting from the lever 74, is embraced by the slotted end of a rod 77, and the left-hand end of this rod is forked so as to be guided upon the cam-shaft 55. A spring 78 connects the rod with the pin 76, so that normally the pin is at the left-hand end of the slot in the rod, as shown in Fig. 1. A cam-roller 79, journaled upon the rod 77, engages a cam-slot 81 in a cam 82 which is fixed upon the cam-shaft. This cam is so formed, as shown in Fig. 2, that during each dwell in the movement of the conveyer-wheel the rod 77 is drawn to the left, thus swinging the lever 74 and sliding the plunger 71 in the same direction. The plunger accordingly passes through the fruit-holder, and its concave left-hand end engages the apple therein and expels it horizontally from the fruit-holder. In the drawings an apple-paring machine is illustrated, in dotted lines, in the position which it occupies when arranged to be fed by the present machine, one of the forks 84 of the paring-machine being in such position that the apple will be impaled upon it by the action of the plunger 71, with the core-axis of the apple coinciding with the axis of rotation of the fork.

In order that the apple may be completely impaled upon the fork without regard to the size of the apple, it is necessary that a part, at least, of the movement of the plunger 71 be yielding, so that in the case of a large apple the movement of the plunger may be arrested by the apple earlier than in the case of a smaller apple. This mode of operation is permitted by the spring 78 above referred to, which yields after the apple has been completely impaled and during the last part of the left-hand movement of the rod 77.

In order that the apple may be impaled in the proper position upon the fork 84, it is necessary to guard against any accidental angular movement of the apple, during the transfer-movement from the fruit-holder, by which its core-axis may be disalined with the axis of the fruit-holder. To this end we provide means by which the apple is held firmly against the end of the plunger 71 during the transfer-movement. For this purpose a bifurcated plate or abutment 91 is carried by a stem 92 projecting from a lever-arm 93. This lever-arm is journaled upon a stud 94 in the frame of the machine, and is integral with a second lever-arm 95 which carries a cam-roller 96 engaging the periphery of a cam 97 fixed upon the cam-shaft 55. A spring 98, coiled about the hub of the lever-arm 93, normally holds this arm in its right-hand position, clear of the forks of the paring-machine and adjacent to the end of the fruit-holder, as shown in Fig. 1. At this time the cam-roller 96 rests upon a low point upon the cam 97. Just before the transfer-movement of the plunger 71, after the conveyer-wheel next comes to rest the abutment 91 receives a slight further right-hand movement so that it engages the apple at the end of its core-axis. The plunger then advances, and the abutment yields to the transfer-movement through its resilient support by the spring 98. This engagement with the apple continues until the impaling-movement has been completed. Before the withdrawing-movement of the plunger 71 occurs, however, the cam-roller 96 is engaged by a high point on the cam 97, as shown in dotted lines in Fig. 2, so that the abutment 91 is momentarily held, and thus prevented from forcing the apple off the fork again. The illustrated machine is adapted to coöperate with an apple-parer of well-known form, in which two forks are employed, as shown in Fig. 8, these forks being mounted upon a rotary carrier so that after each fork has received an apple it is swung through a half-rotation, as shown by the arrow in Fig. 8, to the position of operation in which the apple is pared. This movement of the forks occurs while the abutment 91 is held as just described, the downward swinging movement of the fork being permitted by the bifurcated form of the abutment. After the fork has performed this transfer-movement the cam-roller 96 engages a lower part of the cam 97, owing to the continuous rotary movement of the latter, and thus is permitted to return to the normal position of Fig. 1.

In order to effectively prevent the impaling-mechanism from accidentally forcing the apple too far upon the fork, as might occur in the case of a soft or partly decayed apple owing to the slight resistance of its substance to the impaling-operation, we provide a positive stop to arrest the movement of the abutment 91, thus causing this abutment to act to positively arrest the impaling-movement of the apple at the proper point. This stop, in the case of an apple-paring machine, is preferably mounted upon the fork-carrier, and for this purpose we employ, as shown in Figs. 2 and 8, a lug 85 projecting from the fork-carrier 99 in position to engage and arrest the stud 92 at the proper point.

The operation of the machine as a whole is as follows: At each dwell of the conveyer-wheel an apple is discharged into one of the fruit-holders through the chute 32, and during the next succeeding movement of the conveyer-wheel this apple is conveyed from the position 40, in Fig. 1, to the position 50, the fruit-holder during this movement remaining in open position. At the next movement of the conveyer-wheel the apple is brought to the position 60, where it floats in the water and begins to assume a position of equilibrium therein. During the next movement of the conveyer-wheel the fruit-holder is momentarily closed upon the apple to prevent disturbance in the angular position of the apple, and the apple is thus brought to the position 70, where the fruit-holder is again opened. The apple now completes its righting movement in the water. At this point the axis of the fruit-holder is substantially vertical, as shown in Fig. 1, owing to the fact that the fruit-holders are placed upon the conveyer-wheel with their axes tangent to a circle concentric with the shaft 11. Accordingly, at the next movement of the wheel the fruit-holder is closed upon the apple with the apple in such a position that its core-axis coincides with the axis of the fruit-holder. The apple is now brought, by three successive movements of the conveyer, to horizontal position in line with the fork of the paring-machine, and is then discharged, as above described, from the fruit-holder and impaled upon the fork, the operation of the feeding-machine being thus completed. The fork is then swung from its apple-receiving position by the operation of the apple-parer, and during this swinging-movement the abutment 91 is returned to normal position so as to avoid interference with the movement of the other fork in assuming the position of reception.

The apple-parer is not shown in detail, as it may be of any ordinary or suitable form, but it is illustrated as connected with the power-shaft 57 by means of sprockets and a chain 100, so that it may be driven positively in timed coöperation with the feeding-machine.

The machine hereinbefore described is adapted to feed apples or other fruit to any machine of which the operation necessitates a definite position of the axis of the fruit. By the use of a conveyer in the form of a wheel, together with the fruit-holders arranged thereon in the peculiar position described, the machine is rendered simple in construction while providing, at the same time, for the simultaneous immersion, in the water-tank, of a plurality of fruits, whereby ample time is afforded for the righting action of the water upon each fruit notwithstanding the fact that the machine operates fast enough to keep an ordinary power-driven apple-parer fully supplied.

The means, above described, for transferring the fruits from the holders to the fork or other receiving-device not only act to prevent the accidental angular movement, during the transferring-action, of the axis of the fruit from its position in alinement with the axis of the fruit-holder, but said means also tend, on the other hand, to move the fruit to proper axial position in case it has not been completely righted beforehand by flotation, this result being due to the pressure of the plunger and the abutment against the flattened ends of the fruit.

Our invention is not limited to the embodiment thereof hereinbefore described and illustrated in the accompanying drawings, but it may be embodied in various other forms within the nature of the invention, as hereinafter claimed.

I claim:—

1. A fruit-feeding machine having, in combination, an endless conveyer provided with a series of outwardly-projecting fruit-holders adapted to open and close laterally; means for moving the conveyer intermittently and for introducing fruit to and discharging it from the successive fruit-holders; a receptacle located beneath the lowermost portion of the conveyer and adapted to contain a liquid in which the lowermost fruit-holders are immersed, and means for closing the holders successively upon the fruit while in said receptacle.

2. A fruit-feeding machine having, in combination, an endless conveyer movable in a plane at an angle to the horizontal and provided with a series of fruit-holders adapted to open and close laterally; means for moving the conveyer intermittently and for introducing fruit to and discharging it from the fruit-holders in the direction of their axes; a receptacle adapted to contain a liquid in which the fruit may be floated, said receptacle being mounted beneath a portion of the conveyer upon which the fruit-holders are downwardly-directed, so that said fruit-holders may be immersed in the liquid without the immersion of any portion of the conveyer; and means for closing the holders successively upon the fruit while so immersed.

3. A fruit-feeding machine having, in combination, an endless conveyer provided with a series of fruit-holders adapted to open and close laterally; means for moving the conveyer intermittently through a curved path in a plane at an angle to the horizontal; means for introducing fruit to and discharging it from the successive fruit-holders during dwells in the movement of the conveyer; and a receptacle located adjacent a portion of the conveyer at which the fruit-holders are in depending position, the receptacle being adapted to contain a liquid to float the fruit in the fruit-holders and the conveyer being adapted to lower the fruit-holders into and raise them from said receptacle; the fruit-holders being arranged upon the conveyer with their axes at such an angle that they are in substantially vertical position at the point of emergence from the receptacle.

4. A fruit-feeding machine having, in combination, a conveyer-wheel rotatable in a plane at an angle to the horizontal a series of fruit-holders mounted upon the wheel and adapted to open and close laterally; means for moving the conveyer-wheel intermittently and for introducing fruit to and discharging it from the fruit-holders axially during the dwells in the movements of the wheel; a receptacle located beneath the lowermost portion of the conveyer-wheel and adapted to contain a liquid in which the lowermost fruit-holders are immersed; and means for closing the fruit-holders successively upon the fruit while in said receptacle.

5. A fruit-feeding machine having, in combination, a conveyer-wheel rotatable in a plane at an angle to the horizontal; a series of fruit-holders mounted upon the wheel and adapted to open and close laterally; means for moving the conveyer-wheel intermittently and for introducing fruit to and discharging it from the fruit-holders axially during the dwells in the movements of the wheel; a receptacle located beneath the lowermost portion of the conveyer-wheel and adapted to contain a liquid in which the lowermost fruit-holders are immersed; and means for closing the fruit-holders successively upon the fruit while in said receptacle, the fruit-holders being mounted upon the conveyer-wheel at such an angle that their axes lie in substantially vertical position at the point of their emergence from the receptacle.

6. A fruit-feeding machine having, in combination, a conveyer-wheel rotatable in a vertical plane; a series of fruit-holders mounted upon the wheel and adapted to open and close laterally; means for moving the conveyer-wheel intermittently and for introducing fruit to and discharging it from the fruit-holders axially during the dwells in the movements of the wheel; a receptacle located beneath the lowermost portion of the conveyer-wheel and adapted to contain a liquid in which the lowermost fruit-holders are immersed; and means for closing the fruit-holders successively upon the fruit while in said receptacle, the fruit-holders being mounted upon the wheel with their axes tangent to a circle concentric therewith, so that the fruit-holders, at the point of emergence from the receptacle, are in substantially vertical position.

7. A fruit-feeding machine having, in combination, a fruit-holder adapted to open and close laterally and to receive and deliver a fruit by movement of the fruit in the direction of its axis; means for delivering fruit to the fruit-holder; means for moving the fruit-holder from the point at which the fruit is received to a position of presentation with respect to a machine to which the fruit is to be delivered; and means, for discharging the fruit from the fruit-holder, comprising abutments movable axially with respect to the fruit-holder and adapted to engage the fruit firmly at opposite points and maintain such engagement during the axial movement by which the fruit is transferred from the fruit-holder to the machine which is to be fed.

8. A fruit-feeding machine adapted to coöperate with an apple-parer and to deliver apples one by one to the fork of the parer, the feeding-machine having, in combination, a fruit-holder adapted to grip an apple laterally and to receive and discharge the apple by an axial movement of the apple with respect to the holder; means for delivering an apple to the fruit-holder; means for moving the fruit-holder from the position of reception to a position in which its axis is in alinement with the axis of the fork of the paring-machine; and means for transferring the apple from the fruit-holder in the latter position to the fork, said means comprising a plunger movable axially through the fruit-holder in the direction of said fork, and an abutment adapted to yieldingly engage the apple opposite to the point of engagement of the plunger and to hold the apple against the plunger until it has been impaled upon the fork of the parer.

9. A fruit-feeding machine adapted to coöperate with an apple-parer and to deliver apples one by one to the fork of the parer, the feeding-machine having, in combination, a fruit-holder adapted to grip an apple laterally and to receive and discharge the apple by an axial movement of the apple with respect to the holder; means for delivering an apple to the fruit-holder; means for moving the fruit-holder from the position of reception to a position in which its axis is in alinement with the axis of the fork of the paring-machine; and means for transferring the apple from the fruit-holder in the latter position to the fork, said means comprising a plunger movable axially through the fruit-holder in the direction of the fork, and an abutment adapted to yieldingly engage the apple opposite to the point of engagement of the plunger and to hold the apple against the plunger until it has been impaled upon the fork; said abutment being bifurcated to permit the fork to be withdrawn by a transverse movement before the abutment returns to normal position.

10. A fruit-feeding machine adapted to coöperate with an apple-parer and to deliver apples one by one to the fork of the parer, the feeding-machine having, in combination, a fruit-holder adapted to grip an apple laterally and to receive and discharge the apple by an axial movement of the apple with respect to the holder; means for delivering an apple to the fruit-holder; means for moving the fruit-holder from the position of reception to a position in which its axis is in alinement with the axis of the fork of the paring-machine; and means for transferring the apple from the fruit-holder in the latter position to the fork, said means comprising a plunger movable axially through the fruit-holder in the direction of the fork, an abutment adapted to yieldingly engage the apple opposite to the point of engagement of the plunger and to hold the apple against the plunger until it has been impaled upon the fork, and means for positively arresting the abutment in a position to limit the impaling-movement.

11. A fruit-feeding machine adapted to coöperate with an apple-parer and to deliver apples one by one to the fork of the parer, the feeding-machine having, in combination, a fruit-holder adapted to grip an apple laterally and to receive and discharge the apple by an axial movement of the apple with respect to the holder; means for delivering an apple to the fruit-holder; means for moving the fruit-holder from the position of reception to a position in which its axis is in alinement with the axis of the fork of the paring-machine; means for transferring the apple from the fruit-holder in the latter position to the fork, said means comprising a plunger movable axially through the fruit-holder in the direction of the fork, an abutment adapted to yieldingly engage the apple opposite to the point of engagement of the plunger and to hold the apple against the plunger until it has been impaled upon the fork, and means for holding the abutment momentarily in position, to permit the fork and the apple to be moved away therefrom transversely, and for thereafter returning the abutment to normal position before another fork of the paring-machine assumes the position of presentation.

12. A fruit-feeding machine having, in combination, a conveyer provided with a series of fruit-holders adapted to hold fruit in a definite axial position and to transfer it to a point of delivery, a receptacle adapted to hold liquid and through which the fruit-holders and the fruit therein pass before reaching said point of delivery, and baffles located within the receptacle and close alongside the path of movement of the fruit-holders, whereby agitation in the liquid in which the fruit is immersed is minimized.

FRANKLIN B. PEASE.
JOHN W. PEASE.

Witnesses:
L. Thon,
C. W. Carroll.

Copies of this patent may be obtained for five cents each, by addressing the "Commissioner of Patents, Washington, D. C."